United States Patent
Hansen

(10) Patent No.: US 8,583,061 B2
(45) Date of Patent: Nov. 12, 2013

(54) PEAK SUPPRESSION ON MULTICARRIER

(75) Inventor: Niels-Henrik Lai Hansen, Frederiksberg (DK)

(73) Assignee: Motorola Solutions, Inc., Schaumburg, IL (US)

(*) Notice: Subject to any disclaimer, the term of this patent is extended or adjusted under 35 U.S.C. 154(b) by 215 days.

(21) Appl. No.: 13/289,159

(22) Filed: Nov. 4, 2011

(65) Prior Publication Data

US 2013/0115899 A1    May 9, 2013

(51) Int. Cl.
*H04B 1/04* (2006.01)
*H04B 17/00* (2006.01)

(52) U.S. Cl.
USPC ............ 455/114.2; 455/63.1; 455/67.13; 375/296

(58) Field of Classification Search
USPC ............ 455/63.1, 67.11, 67.13, 114.2, 114.3, 455/115.1, 115.3, 127.1, 552.1; 375/296, 375/297
See application file for complete search history.

(56) References Cited

U.S. PATENT DOCUMENTS

| | | | | |
|---|---|---|---|---|
| 5,727,026 | A  * | 3/1998 | Beukema | 375/296 |
| 7,095,798 | B2 * | 8/2006 | Hunton | 375/296 |
| 7,305,041 | B2 * | 12/2007 | Anvari | 455/114.2 |
| 7,453,953 | B2 | 11/2008 | Park et al. | |
| 7,489,907 | B2 * | 2/2009 | Hasegawa et al. | 455/63.1 |
| 2008/0200126 | A1 | 8/2008 | Okada | |
| 2012/0171975 | A1 * | 7/2012 | Park et al. | 455/127.1 |

OTHER PUBLICATIONS

PCT/US2012/060964—Corresponding International Search Report dated Jan. 22, 2013—11 pages.

* cited by examiner

*Primary Examiner* — Quochien B Vuong
(74) *Attorney, Agent, or Firm* — Barbara R. Doutre

(57) ABSTRACT

A ceiling value can be established (505) for a sum of peak power for a first baseband signal (330) and a second baseband signal (332). No correlation needs to exist between the power peaks of the baseband signals (330, 332). A detection can occur (510) indicating that a sum of the baseband signals (330, 332) has a peak power exceeding the ceiling value. This detection can result in modifications of both the first baseband signal and the second baseband signals. Each is modified by: first modifying each signal so that the sum of the signals is less than the ceiling value (515), to filter the results with a root raised cosine function (520), to window clip the filtered results (525), and to filter the clipped results using a root raised cosine filter (525).

21 Claims, 5 Drawing Sheets

US 8,583,061 B2

PEAK SUPPRESSION ON MULTICARRIER

FIELD OF THE DISCLOSURE

The present invention relates to wireless communications and, more particularly, to peak suppression on a multicarrier communication device.

BACKGROUND

The peak-to-average ratio of a communication signal is of critical importance to the cost, complexity, and size of a radio's (or other communication device's) linear power amplification system. Seemingly small reductions in peak-to-average ratio (PAR) can have a significant impact on each of the above-mentioned system characteristics. That is, the higher a linearity of a linear power amplifier, the higher the power consumption, cost, and size of the linear power amplifier. Further, efficiency of a power amplifier can drop off quickly, since it is designed for the peak power handled by a communication device.

In order to minimize the cost, size, and power consumption of a mobile communication device, there is a need for efficient techniques to suppress PAR. This is especially true for communication devices that include a multicarrier transmitter.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
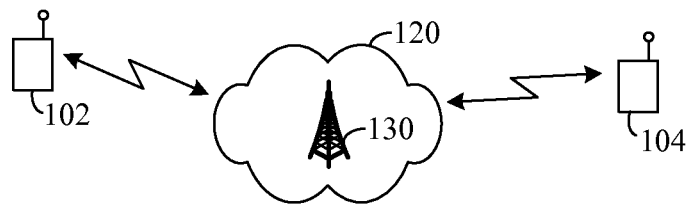
FIG. 1 shows a system that includes communication devices in accordance with an embodiment of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One embodiment of the disclosure can perform peak suppression on a multicarrier transmitter or on a device equipped with a multicarrier transmitter. In the embodiment, a ceiling value (e.g., cx) can be established for a sum of peak power for a first baseband signal, which is referred to as A(t), and a second baseband signal, which is referred to as B(t). No correlation needs to exist between the power peaks of the A(t) signal and the B(t) signal. The A(t) signal and the B(t) signal may be associated with different mobile telephony carriers, and are to be conveyed concurrently from the multicarrier transmitter of a communication device. A detection can occur indicating that a sum of the A(t) signal and the B(t) signal has a peak power exceeding the ceiling value.

Responsive to the detection, a series of actions can be taken, which cause a peak of the amplitude sum to be clipped to a maximum of an established ceiling value. For instance, the A(t) signal can be modified to generate a modified baseband signal, referred to as A'(t). The B(t) signal can be modified to generate a modified baseband signal, referred to as B'(t). A sum of the A'(t) signal and the B'(t) signal can have a peak power lower than the ceiling value. Each signal can be clipped by a ratio of that signal divided by a sum of the two signals (A(t)+B(t)). The ratio can define a level of clipping that is to occur against each signal to ensure the resulting sum of signals is less than the ceiling value. In one embodiment, the ratio can be different for each of the signals, so that one signal is clipped proportionally more than the other.

The following equations can be used in one embodiment to modify the A(t) signal and the B(t) signal:

$$A'(t) = cx * \frac{|A(t)|}{|A(t)| + |B(t)|} * e^{jArg(A(t))}$$

$$B'(t) = cx * \frac{|B(t)|}{|A(t)| + |B(t)|} * e^{jArg(B(t))}$$

Other equations/methods/algorithms are possible and are to be included within the scope of the disclosure as long as the peak of the amplitude sum is clipped to a maximum of cx (a defined ceiling value). For example, different embodiments can include different weight on the signals A'(t) and B'(t) so that the clipping is biased, causing one of the signals to be proportionally clipped greater than the other signal(s).

Post processing operations can occur against the clipped signals to smooth the resulting signals before they are amplified. Smoothing operations may involve use of one or more filters and zero or more additionally clipping operations. The overarching consideration is generate two signals having a sum under a ceiling while attempting to maintain the signal characteristics of the two signals to ensure communication quality does not diminish appreciably or at least does not diminish beyond a minimum established signal quality requirement/preference.

In one embodiment, the A'(t) signal can be filtered with a root raised cosine filter to create a modified baseband signal, referred to as an A"(t) signal. The B'(t) signal can be filtered with a root raised cosine filter to create a modified baseband signal, referred to as a B"(t) signal. The A"(t) signal can be window clipped to create a modified baseband signal, referred to as an A'"(t) signal. The B"(t) signal can be window clipped to create a modified baseband signal, referred to as a B'''(t) signal. The A'''(t) signal can be filtered with a root raised cosine filter to create a modified baseband signal, referred to as an A''''(t) signal. The B'''(t) signal can be filtered with a root raised cosine filter to create a modified baseband signal, referred to as a B''''(t) signal. The A''''(t) signal and the B''''(t) signal can be conveyed to components for further processing, wherein the further processing results in an amplified version of a sum of the A''''(t) signal and the B''''(t) signal being transmitted by a dual carrier transmitter. The above solution can be extended to apply to more than two signals, which are transmitted by a multi-carrier transmitter.

To elaborate, the peak-to-average (PAR) ratio can be defined as a ratio between the peak and average power in the signal. As multiple signals are added with no correspondence between them, the peaks add up correspondingly.

$$V\text{peak} = V\text{peak1} + V\text{peak2}$$

The peak power associated with the sum corresponds to an unmodulated RF carrier (cw) giving the same peak voltage as the summed signals. The power of this signal thus reduces to the following equation.

$$P = \frac{P\text{peak1} + P\text{peak2} + 2 \cdot \sqrt{P\text{peak1}} \cdot \sqrt{P\text{peak2}}}{2}$$

As can be seen, the peaks add such that if two signals have the same peak power, the resulting peak power will be two times that of a single signal.

Thus, a dual carrier transmitter should be able to handle any combination of carriers efficiently. Peak suppression needs to be applied to any combination of 50/25 kHz Terrestrial Trunked Radio (TETRA) Enhanced Data Services (TEDS) (quadrature amplitude modulation (QAM) 4, 16, or 64) and TETRA1 (pi/4DQPSK) signals as per the following table provided as one illustrative example of the disclosure.

TABLE A

| Carrier 1 | Carrier 2 |
|---|---|
| TETRA1 | TETRA1 |
| TEDS50 | TEDS50 |
| TEDS25 | TEDS25 |
| TEDS25 | TEDS50 |
| TETRA1 | TEDS25 |
| TETRA1 | TEDS50 |

Assuming Carrier1 and Carrier2 always have the same peak power, the results of the following table can be obtained, assuming no peak suppression on the TETRA1 signals. The required Packet Traffic Arbitration (PTA) for the cases is also shown.

TABLE B

| Modulation | PTA if nothing is done | Desired PTA |
|---|---|---|
| 2 × TETRA1 | 6.2 dB | 4 dB |
| 2 × TEDS | 10 dB | 7 dB |

Known approaches to achieve the desired PTA, per the example above have significant shortcomings, which are resolved by the inventive arrangements provided in the disclosure. For example, one known solution is to peak suppress two signals independently. This approach has the effect of bringing the overall peak down, but the total signal is still potentially twice (or 3 dB higher) the individual signals.

Thus, using the values of TABLE B, a TETRA1 signal would have to be suppressed to 1 dB PTA and the TEDS signal to 4 dB PTA. This level of suppression is not possible without seriously damaging the signals. Thus, the desired PTA is not possible from a practical perspective, if suppressing each signal individually.

The disclosed technique achieves the desired PTA by peak suppressing a maximum envelop sum at baseband. This solution allows processing to be carried out in the baseband with bandwidth no larger than the individual carriers. It also results in peak suppression that is independent of the delta frequency between carriers.

Turning to the figures, a communication system where peak suppression is performed is illustrated in FIG. 1 in accordance with inventive arrangements detailed herein. The system 100 contains communication devices 102, 104 and an infrastructure 120. The communication devices 102, 104 include one or more transmitters and one or more receivers. The transmitter(s) initiates a transmission that is eventually received by the receiver(s). The transmission can be analog or digital and may contain audio, textual and/or visual data. The communication devices 102, 104 may communicate using any of a number of known modulation types such as differential quadrature phase shift keying (e.g., n/4-DQPSK), phase-shift keying (e.g., 9PSK), QAM in systems such as code division multiple access (CDMA), time division multiple access (TDMA), global system for mobile (GSM), association of public-safety communications officials-international project 25 (APCO-25 or Project 25), and/or TETRA. The communication devices 102, 104 may be mobile or fixed to one location. The infrastructure 120 includes base stations 130 and other devices, however only one base station 130 is shown for convenience. Each base station 130 serves communication devices 102, 104 that lie within its cell. The communication devices 102, 104 may be in the same or different cells.

Figure 2:
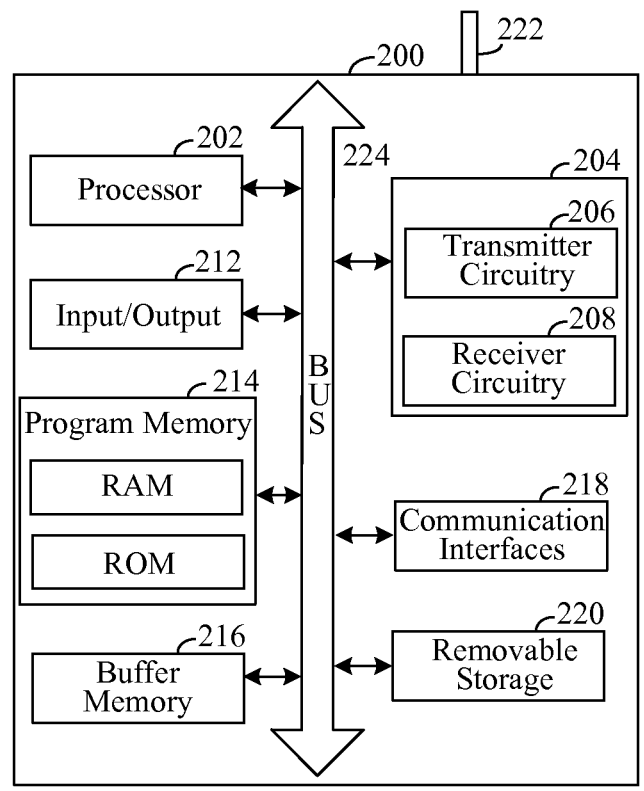
FIG. 2 shows a block diagram of a communication device with a multicarrier transmitter in accordance with an embodiment of the disclosure.

One example of a block diagram of a communication device 200 with a multicarrier transmitter is shown in FIG. 2. The communication device 200 of FIG. 2 can represent one or more of the communication devices 102, 104 discussed in system 100. The communication device 200 contains, among other components, a processor 202, a transceiver 204 including transmitter circuitry 206 and receiver circuitry 208, an antenna 222, input/output device(s) 212, a program memory 214 for storing operating instructions that are executed by the processor 202, a buffer memory 216, one or more communication interfaces 218, and/or a removable storage 220. The communication device 200 can be an integrated unit containing the elements depicted in FIG. 2, as well as any other element necessary for the communication device 200 to perform its electronic function. Alternatively, the communication device 200 may comprise a collection of appropriately interconnected units or devices, wherein such units or devices perform functions that are equivalent to the functions performed by the elements of the communication device 200. The electronic elements are connected by a bus 224.

The processor 202 includes one or more microprocessors, microcontrollers, DSPs, state machines, logic circuitry, or any other device or devices that process information based on operational or programming instructions. Such operational or programming instructions are stored in the program memory 214. The program memory 214 may be an IC memory chip containing any form of random access memory (RAM) or read only memory (ROM), a hard disk drive, a flash memory card or any other medium for storing digital information. One of ordinary skill in the art will recognize that when the processor 202 has one or more of its functions performed by a state machine or logic circuitry, the memory 214 containing the corresponding operational instructions may be embedded within the state machine or logic circuitry. The operations performed by the processor 202 and the rest of the communication device 200 are described in detail below.

The transmitter circuitry 206 and the receiver circuitry 208 enable the communication device 200 to respectively transmit outgoing signal(s) and receive other incoming communication signal(s). The transmitter circuitry 206 can be a true multicarrier transmitter in one embodiment. The circuitry 206 can peak suppress signals before they are conveyed to a power amplifier component. The transmitter circuitry 206 and the receiver circuitry 208 can include appropriate circuitry to enable wireless transmissions. The implementations of the transmitter circuitry 206 and the receiver circuitry 208 depend on the implementation of the communication device 200 with which it is to interact. For example, the transmitter and receiver circuitry 206, 208 may be implemented as part of the communication device hardware and software architecture in accordance with known techniques. The processor 202, the transmitter circuitry 206, and the receiver circuitry 208 have been artificially partitioned herein to facilitate a better understanding.

One of ordinary skill in the art will recognize that most, if not all, of the functions of the transmitter or receiver circuitry 206, 208 may be implemented in a processor, such as the processor 202. For instance, one contemplated embodiment can implement a set (or a subset) of the functions detailed herein into a digital signal processing (DSP) processor. In one embodiment, one or more implementation constraints may limit implementation specific design choices. For example, a high frequency portion of the functions detailed herein may not be able to be implemented in a DSP processor, since the DSP processor may not be fast enough to process the signals without introducing excessive/unacceptable latency into the signal handling process.

The antenna 222 comprises any known or developed structure for radiating and receiving electromagnetic energy at the interference frequency. The buffer memory 216 may be any form of volatile memory, such as RAM, and is used for temporarily storing received information. The input/output devices 212, which are optional, may include an liquid crystal display (LCD organic light emitting diode display (OLED), or any other known display, one or more speakers and microphones, an alpha-numeric keyboard, isolated buttons, soft and/or hard keys, touch screen, jog wheel, and/or any other known input device.

Figure 3:
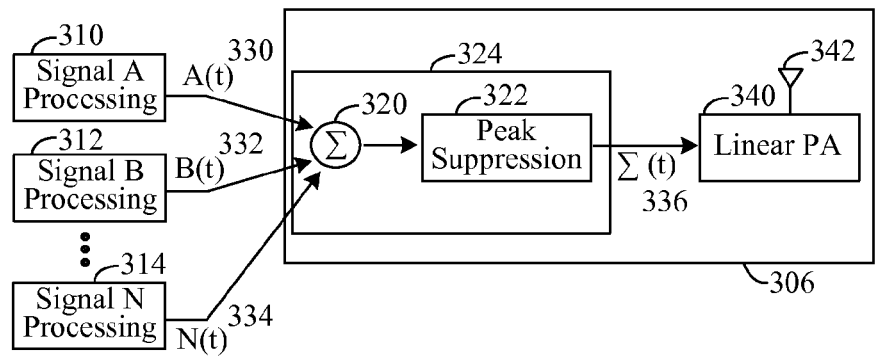
FIG. 3 shows a diagram of a communication device, which provides peak suppression in accordance with an embodiment of the disclosure.

FIG. 3 shows a diagram 300 of a communication device, which provides peak suppression in accordance with an embodiment of the disclosure. The diagram 300 can functionally represent device 200 in one embodiment. Additionally, transmitter circuitry 306 of FIG. 3 can correspond to transmission circuitry 206 of FIG. 2, in one embodiment.

Signal processing components 310, 312, 314 of diagram 300 can independently process a set of signals 330, 332, 334, labeled A(t), B(t), and N(t). In this diagram 300, N can be any integer value from 0 to an arbitrary value. Typically multicarrier communication devices can handle two, three, or four different signals, but the disclosure is not to be considered limited in this regard, as the disclosure scales to any number of signals.

Processing component 324 receives input of multiple signals (A(t), B(t), ... N(t)), which are ultimately combined into a single composite signal 336. That is, processing component 324 has a summing functionality 320 and a peak suppression 322 functionality. The peak suppression functionality 322 can occur before or after the summing 320. After being modified by processing component 324, the generated composite signal can be conveyed to a linear power amplifier (PA) 340, which boosts power of the signal 336 before transmission by antenna 342. The composite signal 336 has its PTA suppressed by component 322 so that the PTA of the composite signal 336 is within the tolerance limits (e.g., ceiling) of the linear PA 340. This is the case, even though the sum of the processed baseband signals 330-334 may exceed the ceiling of the PA 340.

Figure 4A:
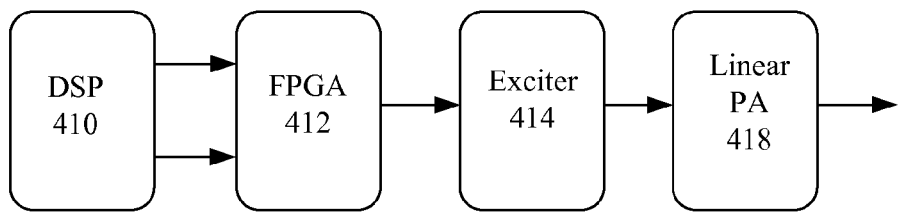
FIG. 4A shows an embodiment with a single wideband exciter in accordance with an embodiment of the disclosure.

FIG. 4A shows an embodiment 404 with a single wideband exciter 414 in accordance with an embodiment of the disclosure. In embodiment 404, digital signal processor (DSP) 410 can convey multiple baseband signals to a field-programmable gate array (FPGA) 412. This generates a single output baseband signal, which is conveyed to wideband exciter 414. Output from the exciter 414 can be handled by linear power amplifier (PA) 418. This output can include a composite signal formed from a combination of two or more baseband signals, where the composite signal has been peak suppressed (such as by peak suppression function 322). The peak suppression can be performed by the exciter 414, the FPGA 412 and/or by components placed between the FPGA 412 and exciter 414. The power amplifier 418 can increase the power of the resulting signal before it is transmitted by an antenna.

Figure 4B:
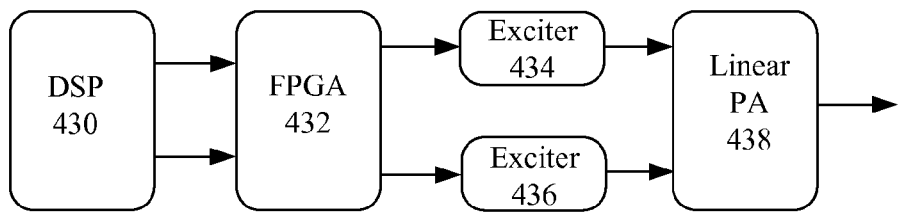
FIG. 4B shows an embodiment with dual narrowband exciters in accordance with an embodiment of the disclosure.

FIG. 4B shows an embodiment 424 with dual narrowband exciters 434, 436 in accordance with an embodiment of the disclosure. In embodiment 424, digital signal processor (DSP) 430 can convey multiple baseband signals to a field-programmable gate array (FPGA) 432. This generates a multiple output baseband signals, each of which is conveyed to a different narrowband exciter 434 and 436. Output from the exciters 434 and 436 can be handled by linear power amplifier (PA) 438. The power amplifier 438 can increase the power of the resulting signals before it is transmitted by an antenna as a single combined signal.

An exciter (e.g., exciter 414, 434, 436), as used herein, comprises components for the low-power radio frequency (RF) stages of a radio transmitter. Thus, each exciter 414, 434, 436 can include an RF oscillator and a modulator.

Figure 5:
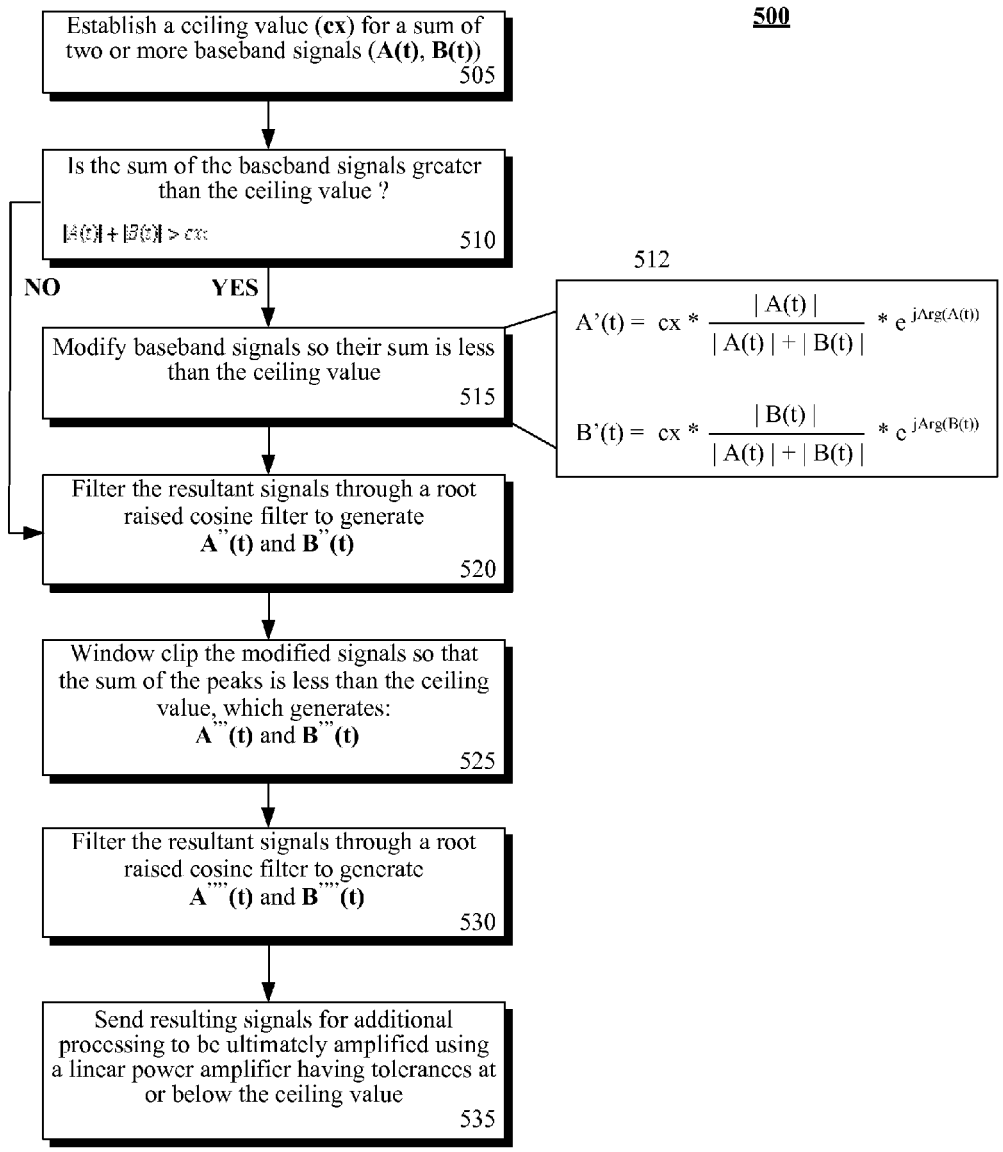
FIG. 5 is a flowchart of a method for peak suppressing baseband signals before amplification in accordance with an embodiment of the disclosure.

FIG. 5 is a flowchart of a method 500 for peak suppressing baseband signals before amplification in accordance with an embodiment of the disclosure. The method 500 can begin in step 505, where a ceiling value (cx) can be established for a sum of two or more baseband signals (A(t), B(t)). In step 510, if the sum of the baseband signals is greater than the ceiling value, the method is to progress to step 515. Otherwise, the method progresses from step 510 to step 520.

In step 515, each of the baseband signals can be modified so that their sum is less than the ceiling value (cx). Any formula that ensures the sum of the baseband signals can be utilized at this step of method 500. That is, the modification of each signal is based on the aggregate (sum) of two or more signals—as opposed to being clipped based on a peak value of a single signal, which can result in over-clipping, which in turn results in more significant signal degradation than necessary.

The formula (s) expressing signal modification can ensure that a modified value of a signal increases as the value of the pre-modified signal increases relative to the sum of the two or more signals. The formula (s) expressing signal modification can also ensure that a modified value of a signal decreases as the value of the pre-modified signal decreases relative to the sum of the two or more signals. Thus, the following mathematical relationships hold for the invention, where $A_{MOD}(t)$ and $B_{MOD}(t)$ represent modified baseband signals, where the modification occurs before the signals are amplified for transmission by a multicarrier transmitter.

$$A_{MOD}(t) = \text{Constant} * \frac{|A(t)|}{|A(t)| + |B(t)|}$$

$$B_{MOD}(t) = \text{Constant} * \frac{|B(t)|}{|A(t)| + |B(t)|}$$

Where $A_{MOD}(t) + B_{MOD}(t) <= \text{ceiling value}(cx)$

Similarly, the value of the modified signal can be inversely proportional to the pre-modified signal. $A_{MOD}(t)$ and $B_{MOD}(t)$ can result from a sequence of two or more processing steps, which include window clipping each signal and smoothing the resulting clipped signal. In some contemplated embodiments, a sequence of two or more clipping stages can occur to produce a two or more modified signals with minimal distortion of the original signal (while ensuring the sum of the signals is less than a ceiling value.

In one embodiment, the A(t) signal can be modified in accordance with the following formula to generate A'(t):

$$A'(t) = cx * \frac{|A(t)|}{|A(t)| + |B(t)|} * e^{jArg(A(t))}.$$

The B(t) signal can be modified in accordance with the following formula to generate B'(t):

$$B'(t) = cx * \frac{|B(t)|}{|A(t)| + |B(t)|} * e^{jArg(B(t))}$$

These formulas are expressed in view 512. Appreciably, the formulas can be modified/weighted in various embodiments and still be considered within scope of the disclosure, so long as the sum of the modified signals is less than the ceiling value.

In step 520 filtering can be performed after the clipping of each of the baseband signals occurs. For example, in step 520, the resulting signals (A'(t) and B'(t)) can be filtered through a first and second root raised cosine filter to generate A"(t) and B"(t), respectively. In one embodiment of step 520, β, or the roll-off factor of the first and/or second root raised cosine function, can be a value of 0.05 (plus or minus twenty-five percent) and Ts, or the reciprocal of the symbol-rate, can be a value of 25000 (plus or minus twenty-five percent). Other values for the roll-off factor and the reciprocal of the symbol-rate can also be used in contemplated embodiments of the disclosure.

Further, other smoothing functions can be applied to the clipped signals, where use of the first and second root raised cosine functions is suitable smoothing function. Because the root-raised cosine functions can cause a sum of the modified signals to exceed the ceiling value (cx), further processing (steps 525, 530) can be optionally performed. In other embodiments, the ceiling value can be set to provide sufficient leeway to ensure the power amplifier can handle the resulting signals (of step 520). For example, in such an embodiment, a slightly lower than optimal ceiling value can be established to minimize the processing steps required of the signals pre-amplification and pre-transmission by a multicarrier transmitter.

Turning to step 525 and the embodiment expressed by method 500, the filtered signals (A"(t) and B"(t)) can be window clipped so that the sum of the peaks is less than the ceiling value. In one embodiment, the window clipping can be done by finding peaks in the sum |A"(t)|+|B"(t)| that exceeds the limit of cx. At these points, A"(t) and B"(t) can be multiplied by a window function spanning approximately 2.6 symbols (plus or minus twenty-five percent) so that the peak of the sum is back at cx. This creates two new signals: A'"(t) and B'"(t).

In step 530, the window clipped signals (A'"(t) and B'"(t)) can be filtered through a third and fourth root raised cosine filters to generate A""(t) and B""(t), respectively. In one embodiment of step 530, β, or the roll-off factor of the third and/or fourth root raised cosine filters, can be a value of 0.05 (plus or minus twenty-five percent) and Ts, or the reciprocal of the symbol-rate, can be a value of 27500 (plus or minus twenty-five percent). Other values for the roll-off factor and the reciprocal of the symbol-rate of the third and fourth root raised cosine filters can also be used in contemplated embodiments of the disclosure.

In step 535, the resulting signals (A""(t) and B""(t)) can be further processed and amplified using a linear power amplifier (PA) having tolerances at or below the ceiling value. For instances, the signals (A""(t) and B""(t)) can be fed into one or more exciters. Any analog post filtering in the set of exciters (or other components) should be counteracted in the final filter (e.g., step 530) so that the peaks of these signals do not substantially rise (i.e., the sum of the signals remain below the ceiling value).

It should be appreciated that as the ceiling value (cx) is lowered (i.e. more compression applied) the adjacent channel power (ACP) and/or error vector magnitude (EVM) will grow. As the window function is made wider (than the 2.6 symbols, for example), ACP will improve but the symbols may smear out. A window clip function may thus affect more than one symbol, which is not desirable in some contemplated embodiments.

Nonetheless, embodiments are contemplated where compression is applied to one or more of the signals, which can minimize the amount of clipping necessary to keep the sum of the signals at or below the ceiling value (cx).

Figure 6A:
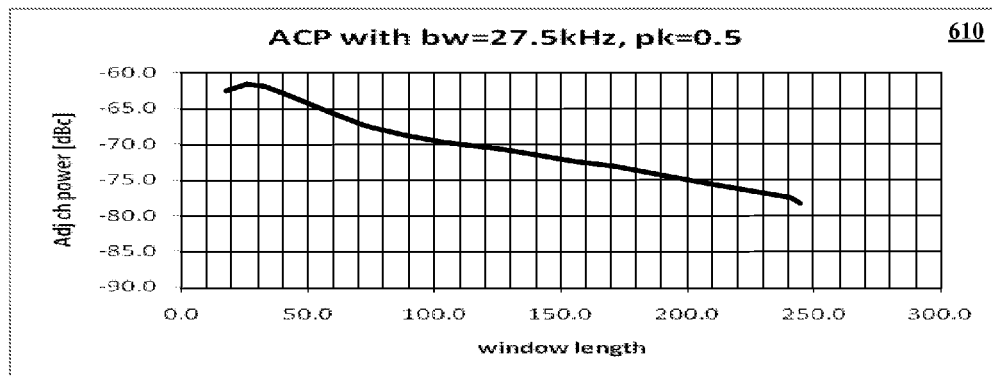
FIGS. 6A and 6B are plots showing selected results covering some examples of significant parameters in accordance with an embodiment of the disclosure.
Figure 6A:
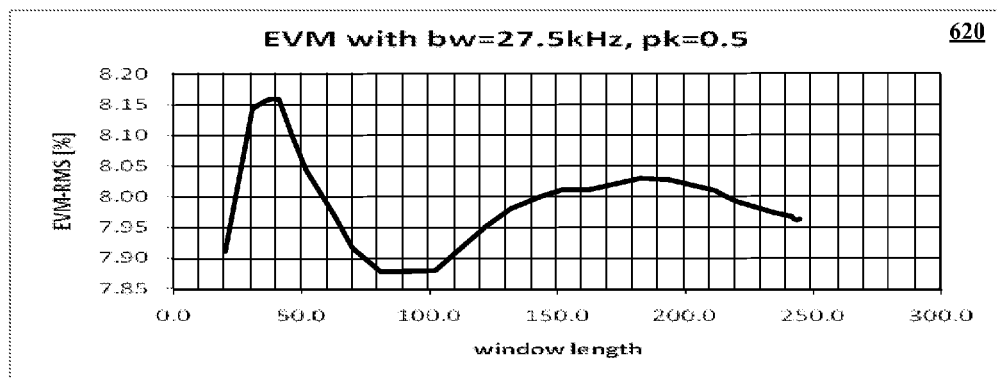
Figure 6A:
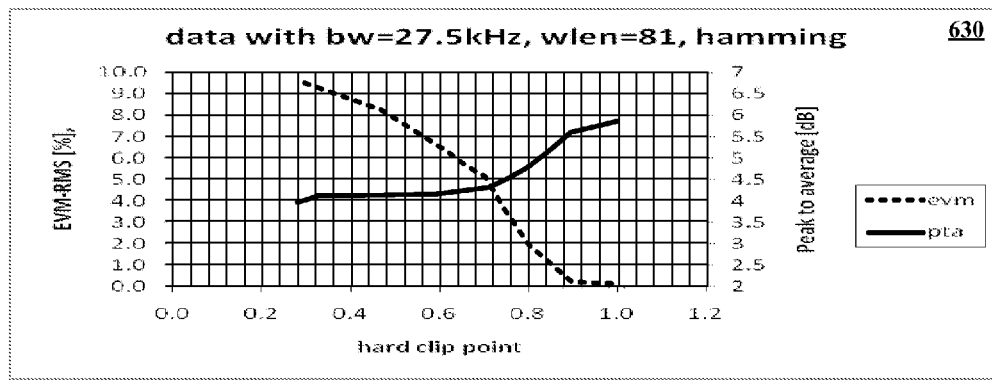
Figure 6B:
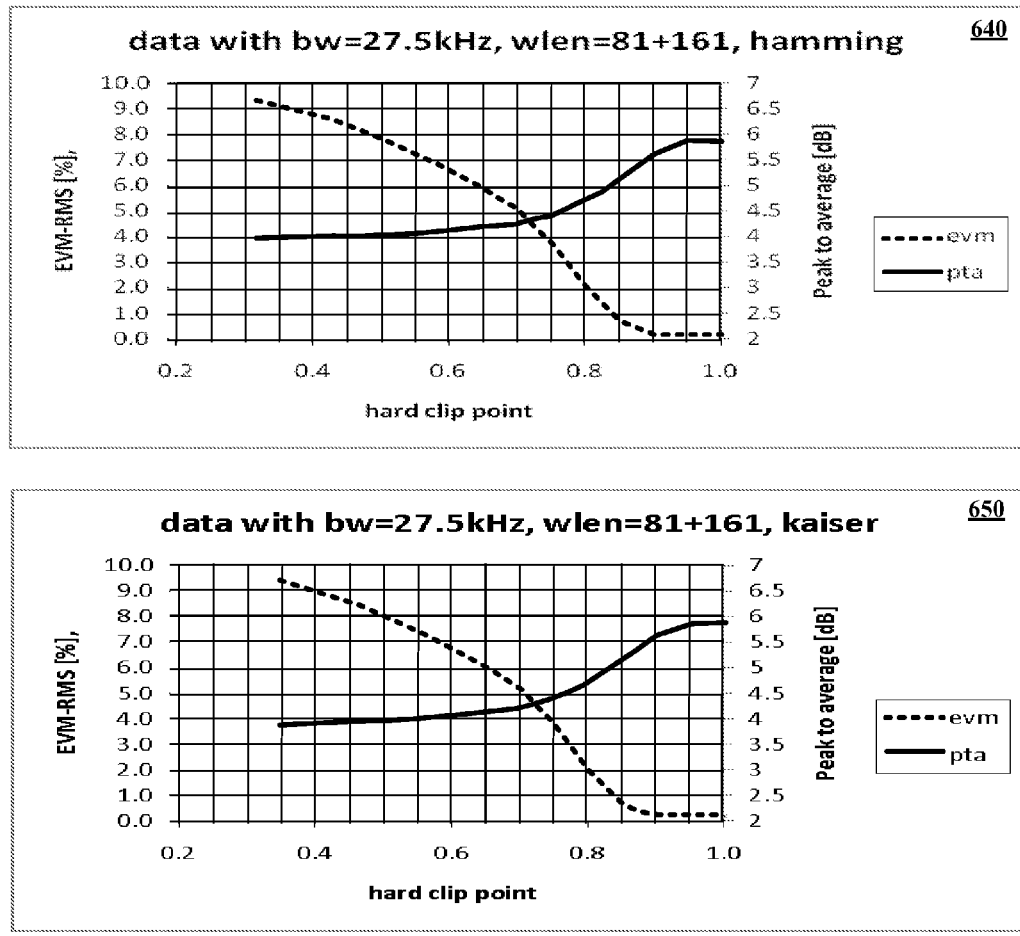

FIGS. 6A and 6B are plots 610, 620, 630, 640, and 650 showing selected results covering some examples of significant parameters in accordance with an embodiment of the disclosure. In the plots 610-630 of FIG. 6A, the represented baseband signal has been oversampled thirty times. Plots 640 and 650 of FIG. 6B show a final window clip filter applied with fixed length of one hundred and sixty-one samples. First is Hamming type, shown in plot 640. Second, shown in plot 650, is Kaiser window having an α of 3.

More specifically, plot 610 shows how adjacent channel power (ACP) improves as window length increases (i.e., as the window function is widened, ACP improves). The improvement in ACP occurs in essentially a linear manner, as shown.

Plot 620 shows how error vector magnitude (EVM) initially has a spike around a window length of 40, plateaus between 80-100 window length, then gradually peaks at a window length of approximately 190, where it slowly tapers.

Plots 630, 640, and 650 show how EVM increases as the hard clip point increases; where at a clip point between 0.3 and 0.7, the PTA is approximately flat; and between 0.7 and 1.0 the PTA increase in an approximately linear fashion. Plots 630, 640, 650 also show that the EVM decrease as the window clip increases in an approximately linear fashion between a clip point of 0.3 and 0.9.

In plots 640 and 650 the sampling size has been increased. Plot 640 shows a Hamming type, while plot 650 shows a Kaiser type. Since Kaiser type (plot 650) of windowing results in a slightly lower set of EVM values, the Kaiser type of windowing may be preferred over the Hamming type.

To summarize, un-like conventional methodologies that peak suppress signals individually, the disclosure performs peak suppression on two or more signals based on their sum. Thus, two or more signals are peak suppressed so that their sum is less than or equal to a ceiling value. This results in the peak of the summed signal remaining below a ceiling defined for a power amplifier of a multicarrier transmitter. At the same time clipping based on a sum of signals results in signals that are minimally distorted or affected by the clipping process. In other words, techniques that clip each signal individually (as opposed to clipping the sum of the signals) over-clip in context of a multicarrier transmitter, which results in greater clip-induced distortions than necessary, as discovered and detailed throughout this disclosure. In contrast, innovations detailed in the disclosure minimally clip a set of signals based on the sum of their peaks before amplification and transmission by a multicarrier transmitter. Thus, minimal clipping (resulting in minimal distortion of the signals) is performed to ensure that the sum of the signals is below a voltage ceiling established for the multicarrier transmitter.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method of peak suppression on a multicarrier transmitter comprising:

establishing a ceiling value for a sum of peak power for a first baseband signal, which is referred to as the A(t) signal, and a second baseband signal, which is referred to as the B(t) signal, and no correlation exists between the power peaks of the A(t) signal and the B(t) signal;

detecting that a sum of the A(t) signal and the B(t) signal has a peak power exceeding the ceiling value;

responsive to the detecting:

modifying the A(t) signal to generate a modified baseband signal, referred to as a A'(t) signal;

modifying the B(t) to generate a modified baseband signal, referred to as a B'(t) signal, wherein a sum of the A'(t) signal and the B'(t) signal has a peak power lower than the ceiling value;

filtering the A'(t) signal with a first root raised cosine filter to create an A"(t) signal;

filtering the B'(t) signal with a second root raised cosine filter to create a B"(t) signal;

window clipping the A"(t) signal to create an A'"(t) signal;

window clipping the B"(t) signal to create a B'"(t) signal;

filtering the A'"(t) signal with a third root raised cosine filter to create an A""(t) signal;

filtering the B'"(t) signal with a fourth root raised cosine filter to create a B""(t) signal; and conveying the A""(t) signal and the B""(t) signal to components for further processing, wherein the further processing results in the A""(t) signal and the B""(t) signal being concurrently amplified by a linear power amplifier and being concurrently transmitted by a dual carrier transmitter.

2. The method of claim 1, wherein the peak suppression is independent of a delta frequency between the A(t) signal and the B(t) signal.

3. The method of claim 1, wherein the ceiling value represents a maximum amount of power that the linear power amplifier of a communication device is able to handle within engineered tolerances when generating the amplified version of any summed signal to be transmitted by the dual carrier transmitter.

4. The method of claim 1, wherein the further processing comprises:
adding the A""(t) signal and the B""(t) signal into a composite signal;
conveying the composite signal to a single exciter for processing; and
conveying results of the single exciter to a linear power amplifier.

5. The method of claim 1, wherein the further comprising comprises:
conveying the A""(t) signal to a first exciter;
conveying the B""(t) signal to a second exciter;
adding results from the first and second exciter into a combined signal; and
conveying the combined signal to a linear power amplifier.

6. The method of claim 1, wherein the A(t) signal and the B(t) signal are for different mobile telephony carriers, and are to be conveyed concurrently from the multicarrier transmitter of a communication device.

7. The method of claim 1, wherein the first and second root raised cosine filters have a roll-off factor of approximately 0.05, wherein approximately as used herein represents plus or minus twenty five percent.

8. The method of claim 1, wherein the first and second root raised cosine filters have a reciprocal symbol-rate of approximately 25,000, wherein approximately as used herein represents plus or minus twenty five percent.

9. The method of claim 1, wherein the first and second root raised cosine filters have a roll-off factor of approximately 0.05, and wherein the first and second root raised cosine filters have a reciprocal symbol-rate of approximately 25,000, wherein approximately as used herein represents plus or minus twenty five percent.

10. The method of claim 1, wherein the third and fourth root raised cosine filter have a roll-off factor of approximately 0.05, wherein approximately as used herein represents plus or minus twenty five percent.

11. The method of claim 1, wherein the first and second root raised cosine filters have a reciprocal symbol-rate of approximately 27,500, wherein approximately as used herein represents plus or minus twenty five percent.

12. The method of claim 1, wherein the first, second, third and fourth root raised cosine filters have a roll-off factor of approximately 0.05, and wherein the first and second root raised cosine filters have a reciprocal symbol-rate of approximately 25,000, wherein the third and fourth root raised cosine filters have a reciprocal symbol-rate of approximately 27,500, and wherein approximately as used herein represents plus or minus twenty five percent.

13. The method of claim 1, wherein the window clipping utilizes a window function spanning approximately 2.6 symbols, wherein approximately as used herein represents plus or minus twenty five percent.

14. The method of claim 1, wherein a clipping amount resulting from modifying the A(t) signal increases as a peak voltage of A(t) signal increases relative to a peak voltage of the B(t) signal, wherein the modifying the B(t) signal increases as a peak voltage of B(t) signal increases relative to a peak voltage of the A(t) signal.

15. A method of peak suppression on a multicarrier transmitter comprising:
establishing a ceiling value for a linear power amplifier of a multicarrier transmitter;
detecting that a sum of two or more signals that are to be concurrently amplified by the linear power amplifier have a peak power exceeding the ceiling value established for the linear power amplifier;
responsive to the detecting that the peak power exceeds the ceiling value:
(i) window clipping a first one of the two or more signals using a first window clipping function, wherein a clipping amount resulting from the first window clipping function increases as a peak voltage of the first signal increases relative to a peak voltage of the second signal, and wherein the clipping amount resulting from the first window clipping function decreases as a peak voltage of the first signal decreases relative to a peak voltage of the second signal;
(ii) window clipping a second one of the two or more signals using a second window clipping function, wherein a clipping amount resulting from the second window clipping function increases as a peak voltage of the second signal increases relative to a peak voltage of the first signal, and wherein the clipping amount resulting from the second window clipping function decreases as a peak voltage of the second signal decreases relative to a peak voltage of the first signal;
wherein a sum of the first and second signals after the window clipping actions is less than or equal to the ceiling value;
concurrently amplifying the window clipped first and second signal using the linear power amplifier; and
concurrently transmitting the amplified first and second signals using the multicarrier transmitter.

16. The method of claim 15, wherein the first signal before it is window clipped is referred to as the A(t) signal, wherein the second signal before it is window clipped is referred to as the B(t) signal, wherein the window clipped signal first signal is referred to as the A'(t) signal, wherein the window clipped second signal is referred to as the B'(t) signal, wherein the A(t), A'(t), B(t), and B'(t) signals are baseband signals said method further comprising:
filtering the A'(t) signal with a first root raised cosine filter to create a modified baseband signal, referred to as a A"(t) signal;
filtering the B'(t) signal with a second root raised cosine filter to create a modified baseband signal, referred to as a B"(t) signal;
window clipping the A"(t) signal to create a modified baseband signal, referred to as a A'"(t) signal;

window clipping the B"(t) signal to create a modified baseband signal, referred to as a B'"(t) signal;

filtering the A'"(t) signal with a third root raised cosine filter to create a modified baseband signal, referred to as a A""(t) signal;

filtering the B'"(t) signal with a fourth root raised cosine filter to create a modified baseband signal, referred to as a B""(t) signal, wherein the concurrently amplified signals are the A""(t) and B""(t) signals.

17. The method of claim 15, further comprising:
after the window clipping actions and before the concurrently amplifying, smoothing the window clipped first and second signals using root raised cosine filters.

18. The method of claim 17, wherein the smoothing of the signals results in a sum of the peak voltage values of the first and second signals exceeding the ceiling value, said method further comprising:
window clipping the smoothed first and second signals so that a sum of their voltages is less than or equal to the ceiling value.

19. The method of claim 15, wherein the first signal before it is window clipped is referred to as the A(t) signal, wherein the second signal before it is window clipped is referred to as the B(t) signal, wherein window clipping the first signal results in a modified signal referred to as $A_{MOD}(t)$, wherein window clipping the second signal results in a modified signal referred to as $B_{MOD}(t)$, wherein the window clipping of the first signal is mathematically expressible as:

$$A_{MOD}(t) = \text{Constant} * \frac{|A(t)|}{|A(t)| + |B(t)|}$$

wherein the window clipping of the second signal is mathematically expressible as:

$$B_{MOD}(t) = \text{Constant} * \frac{|B(t)|}{|A(t)| + |B(t)|}.$$

20. A communications device comprising:
one or more processors, one or more computer-readable memories and one or more computer-readable, tangible storage devices;
a linear power amplifier;
a dual carrier transmitter, and a system bus connecting the processors, the computer-readable memories, the tangible storage devices, the linear power amplifier, and the dual carrier transmitter to each other;
program instructions, stored on at least one of the one or more storage devices for execution by at least one of the one or more processors via at least one of the one or more memories, to establish a ceiling value for a sum of peak power for a first baseband signal, which is referred to as the A(t) signal, and a second baseband signal, which is referred to as the B(t) signal, and no correlation exists between power peaks of the A(t) signal and the B(t) signal;
program instructions, stored on at least one of the one or more storage devices for execution by at least one of the one or more processors via at least one of the one or more memories, to detect that a sum of the A(t) signal and the B(t) signal has a peak power exceeding the ceiling value;
program instructions, stored on at least one of the one or more storage devices for execution by at least one of the one or more processors via at least one of the one or more memories, to, responsive to the detecting:
modify the A(t) signal to an A'(t) signal;
modify the B(t) to generate a B'(t) signal, wherein a sum of the A'(t) signal and the B'(t) signal has a peak power lower than the ceiling value;
filter the A'(t) signal with a first root raised cosine filter to create an A"(t) signal;
filter the B'(t) signal with a second root raised cosine filter to create a B"(t) signal;
window clip the A"(t) signal to create an A'"(t) signal;
window clip the B"(t) signal to create a B'"(t) signal;
filter the A'"(t) signal with a third root raised cosine filter to create an A""(t) signal;
filter the B'"(t) signal with a fourth root raised cosine filter to create a B""(t) signal; and
convey the A""(t) signal and the B""(t) signal to components for further processing, wherein the further processing results in an amplified version after processing by the linear power amplifier of a sum of the A""(t) signal and the B""(t) signal being transmitted by the dual carrier transmitter.

21. A method of peak suppression on a multicarrier transmitter comprising:
establishing a ceiling value for a sum of a first baseband signal and a second baseband signal, wherein no correlation exists between a peak power of the first baseband signal and a peak power of the second baseband signal;
detecting that peak power of the sum of the first baseband signal and the second baseband signal exceeds the ceiling value;
responsive to the detecting:
modifying the first baseband signal and the second baseband signal to generate a first modified baseband signal and a second modified baseband signal, wherein a sum of the first modified baseband signal and the second modified baseband signal has a peak power lower than the ceiling value, and further wherein the modification of the first baseband signal and the second baseband signal is based on an aggregate of values of the first baseband signal and the second baseband signal;
smoothing the first modified baseband signal and the second modified baseband signal to generate a first peak suppressed signal and a second peak suppressed signal;
concurrently amplifying the first peak suppressed signal and the second peak suppressed signal by a linear power amplifier; and
concurrently transmitting the amplified first peak suppressed signal and the amplified second peak suppressed signal using a dual carrier transmitter.

* * * * *